Dec. 11, 1923.
C. W. JOHNSON
1,476,980
LIQUID DISPENSING TANK
Filed Aug. 29, 1921
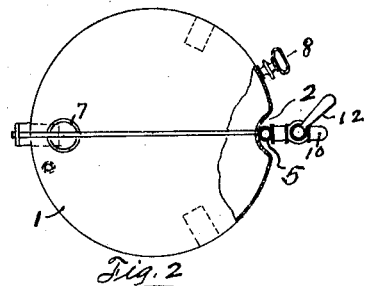
Fig. 2
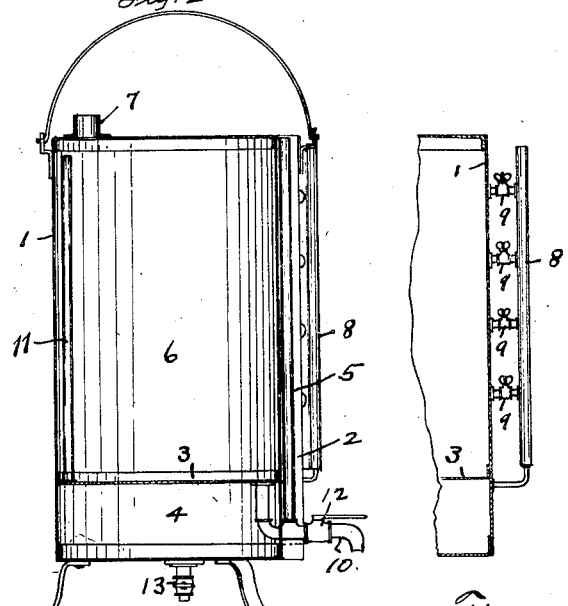
Fig. 1
Fig. 3.
INVENTOR.
Charles W. Johnson
BY
Hardway & Cath.,
ATTORNEYS Patented Dec. 11, 1923.

1,476,980

UNITED STATES PATENT OFFICE.

CHARLES W. JOHNSON, OF HARRISBURG, TEXAS.

LIQUID-DISPENSING TANK.

Application filed August 29, 1921. Serial No. 496,293.

*To all whom it may concern:*

Be it known that I, CHARLES W. JOHNSON, a citizen of the United States, residing at Harrisburg, in the county of Harris and State of Texas, have invented certain new and useful Improvements in a Liquid-Dispensing Tank, of which the following is a specification.

This invention relates to new and useful improvements in a liquid dispensing tank and is particularly adapted for use at gasoline filling stations in dispensing gasoline and other oils.

One object of the invention is to provide a tank of the character described whereby gasoline and other liquids may be measured out to customers in exact quantities.

Another object is to provide a tank of the character described wherein provision is made for inspection of the contents of the tank so that both seller and customer may see that the measurement is correct and the exact amount of the purchase is delivered.

A further feature is embodied in the construction of the tank so as to take care of the overflow without waste.

With the above and other objects in view this invention has particular relation to certain novel features of construction, operation and arrangement of parts, an example of which is given in this specification and illustrated in the accompanying drawings, wherein :—

Figure 1 is a side view of the tank.

Figure 2 is a top plan view, partially in section, and

Figure 3 is a fragmentary vertical sectional view.

Referring now more particularly to the drawings, the numeral 1 designates the tank proper which is preferably formed of sheet metal and of a size to be readily portable. This tank has a vertical groove or corrugation 2 in one side extending from top to bottom thereof. The tank also has a transverse partition 3 near its bottom forming an overflow compartment 4 at the bottom of the tank. Within the grove 2 there is a transparent gauge tube 5, connected at its upper end into the top of the compartment 6 above the partition 3, and at its lower end into the delivery spout 10. The top of the tank has an inlet 7, through which the liquid to be sold may be delivered into the tank from the usual underground receptacle or other container. The tube 5 carries a gauge scale which readily shows the exact amount of the liquid in the compartment 6. The tank carries an exterior overflow pipe 8 which is connected into the compartment 6 at points corresponding to the scale of measurements as shown on the gauge tube 5, and these connections are equipped with outlet valves 9. As a rule the unit of measurement will be the gallon and the tube 5 will carry a corresponding scale running from bottom to top. The overflow pipe 8 is connected at its lower end into the overflow compartment 4. An inner overflow pipe 11 is fastened to the inside wall of the tank and extends from the top thereof into the overflow compartment at the bottom.

By the use of the tank shown any quantity of liquid from one to five gallons may be measured and delivered. If more than the quantity desired is delivered into the tank the valve 9, corresponding to the quantity desired, may be opened and the excess will drain off into the overflow compartment leaving in the compartment 6 the exact amount to be sold. If more than the tank is capable of measuring be delivered into the tank the surplus will drain off through the inner overflow pipe 11 into the overflow compartment 4. When the correct amount is obtained in the tank the valve 12, controlling the spout 10, may be opened and delivery made to the customer. When the overflow compartment 4 becomes full it may be emptied through the drain 13.

What I claim is :—

A device of the character described, including a tank, having a vertical corrugation, a transverse partition therein separating the tank into an upper and a lower compartment, a delivery spout leading from the bottom of the upper compartment, a valve controlling said spout, a transparent tube connected to and upstanding from said spout and located in said corrugation, a vertical overflow pipe connected into the upper compartment at intervals, valves controlling said connections, the lower end of said overflow pipe being connected into said lower compartment, and an overflow tube within the tank and leading from the top thereof and connected into said bottom compartment.

In testimony whereof I have signed my name to this specification in the presence of two subscribing witnesses.

CHARLES W. JOHNSON.

Witnesses:
 LOUISE CATHEY,
 WM. A. CATHEY.